United States Patent [19]

Allen et al.

[11] Patent Number: 5,469,192

[45] Date of Patent: Nov. 21, 1995

[54] METHOD AND APPARATUS FOR INCREASING THE FUNCTIONALITY OF COMPUTER SYSTEM POINTING DEVICES BY SIMULTANEOUS ACTUATION OF BUTTONS THEREON

[76] Inventors: Paul G. Allen; Arthur T. Whitten, both of 110 110th Ave. NE., Suite 700, Bellevue, Wash. 98004

[21] Appl. No.: 31,006

[22] Filed: Mar. 12, 1993

[51] Int. Cl.[6] .................................................. G09G 3/02
[52] U.S. Cl. ........................ 345/157; 345/127; 345/121
[58] Field of Search ..................................... 345/157, 119, 345/146, 133, 153, 163, 87, 121, 127; 395/156

[56] References Cited

U.S. PATENT DOCUMENTS

| | | | |
|---|---|---|---|
| 4,694,286 | 9/1987 | Bergstedt | 345/153 |
| 4,800,510 | 1/1989 | Vinberg et al. | 345/133 |
| 4,931,783 | 6/1990 | Atkinson | 345/146 |
| 5,101,197 | 3/1992 | Hix et al. | 345/87 |
| 5,268,674 | 12/1993 | Howard et al. | 345/163 |

FOREIGN PATENT DOCUMENTS 2161755  1/1986  United Kingdom .

OTHER PUBLICATIONS

Learning How to Use the Iris, Working in a New Space, Documentation Supplement, 4 pages.
Aldus Photostyler User Manual ver 1.1, Jun. 1992.

Primary Examiner—Tommy P. Chin
Assistant Examiner—Gin Goon
Attorney, Agent, or Firm—LaRiviere, Grubman & Payne

[57] ABSTRACT

Method and apparatus for creating a navigation palette in response to simultaneous actuation of any two buttons on a pointing device in a computer system for creating multimedia slide presentations. The navigation palette allows the user to operate on and navigate to and among all of the slides within the presentation during playback.

1 Claim, 4 Drawing Sheets

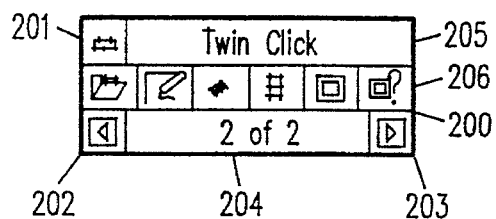
FIG. 2
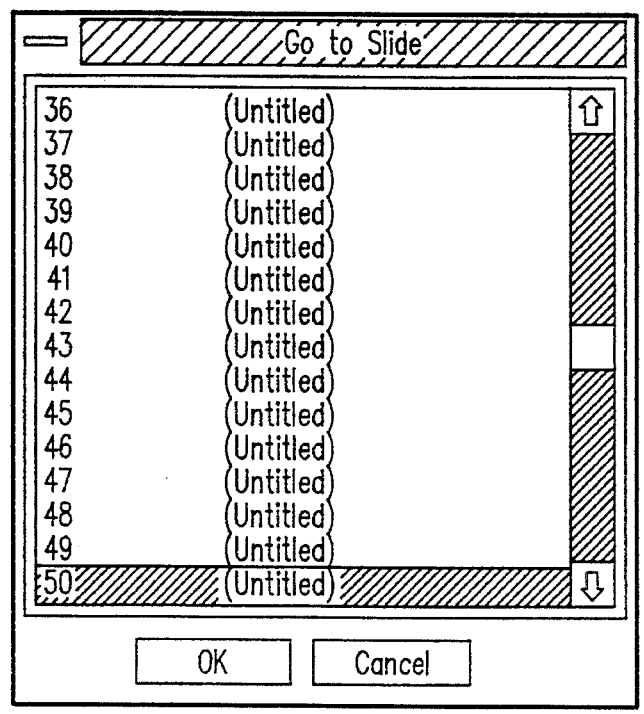
FIG. 4
FIG. 3

METHOD AND APPARATUS FOR INCREASING THE FUNCTIONALITY OF COMPUTER SYSTEM POINTING DEVICES BY SIMULTANEOUS ACTUATION OF BUTTONS THEREON

TECHNICAL FIELD

The present invention relates to a User Interface (UI) for use with computer systems. More particularly, the present invention provides increased functionality for computer system pointing devices used with a presentation graphics program which is used with a Graphics User Interface (GUI) for creating a multimedia slide presentation on a personal computer.

BACKGROUND ART

In the context of the present invention, a presentation is a group of visual aids or slides that are designed and produced to deliver information, whether on a computer screen, a transparency, or overhead projector. On a personal computer system, a slide comprises one screen of information which corresponds to a photographic slide or transparency. Each slide may include text, graphics and charts, or any combination thereof, that is effective or delivering a desired message.

The slides comprising a presentation produced on a personal computer are stored together as a file. Playback of such files may be initiated automatically or manually. In automatic playback, each slide is displayed on a computer screen for a predetermined time before transition is made to the next slide and so on until all of the slides in the presentation file have been displayed. Alternatively, in manual mode, each slide is manually accessed and displayed for as long as the user wishes while discussing the topics shown.

Multimedia slides incorporate data from present-day multimedia devices to add sound effects, animation and video to the text, graphics and charts produced by the computer itself. Even if multimedia is unavailable, computer programs for producing presentations can add many special effects such as transitions between slides and animation.

Presentation graphics programs can also incorporate information created in another program, such as a spreadsheet application. Typically such presentations may be printed out to provide audience handouts and speaker notes.

GUIs for use on computer systems of all sizes and complexities have become extremely popular and important to operators and users of computer systems. It is now well recognized that recognizing graphics is faster than reading text. In the personal computer industry, the Macintosh, produced by Apple Computer Company and Windows Interface Program GUI, produced by Microsoft Corporation, for use on personal computers, such as the PS/2 produced by IBM Corporation, provide convenient, well-known and easily recognized symbols, icons, screen paradigms and all other manner of graphical representations of computer functionality easily manufactured by users. The Iris System used on work station level computer systems, produced by Silicon Graphics, Inc., and Open Book, similarly used on work station computer systems produced by Sun Microsystems, Inc., both provide well-recognized, easily used GUIs. UIs provide enhancements and extensions to GUIs.

GUIs are often used with other applications programs such as word processing and spreadsheet programs. Thus, for example, Word Perfect 5.1 word processing may be used with Windows on a personal computer, model PS/2, produced by IBM Corporation.

While a GUI may be manipulated using a computer keyboard only, the pointing device of choice by most users is a mouse or track ball. These devices are used for moving a cursor across the screen of a computer system to point to or identify a particular object or function the user desires to access or initiate, respectively. Movement of the mouse or the trackball initiates corresponding movement of the cursor across the screen. When the cursor reaches the point or object of interest on the screen, the object is accessed or the function is initiated by actuating one of at least two buttons that form a part of the mouse or trackball.

Some GUIs provide the capability to invert the typical functionality of the pointing device buttons. Therefore, while the so-called "left" button is active according to the usual convention, the "right" button may become active if so desired by the user. Thus, for purposes of describing the present invention, the first button refers to the usually active button for selecting objects and icons and initiating actions according to the prior art.

As personal computers have become more powerful, in both the speed with which they process data and the amount of data they can process, the functionality and complexity of GUIs has grown. Correspondingly, the need to add functionality to pointing devices has similarly increased. Thus, it is desirable to add functionality to pointing devices by defining computer functionality and behavior upon actuation, i.e. depressing, both the first and the second button of a pointing device while the cursor is over an object created by a user or a personal computer system having a GUI.

For purposes of describing the present invention, it should be noted that each slide comprises a template on which objects such as text, graphics and charts are placed. The template, as used herein, comprises a choice of background designs for enhancing display of the objects which appear on top of the desired background design. As indicated earlier, objects may also include video and animation, which also appear on top of the background design provided by the template.

DISCLOSURE OF INVENTION

Simultaneous actuation or "clicking" of both buttons, or any two buttons if there are more, on a mouse or trackball device, according to the present invention, creates a pop-up navigation palette at the location of the cursor on the screen at which the user clicks the buttons. The pop-up palette allows the user to navigate to and among all of the slides within a presentation during playback. The pop-up navigation palette has more than one tier or section of graphically represented controls. The top section of the pop-up palette includes a caption which contains text for identifying the presentation upon which the buttons of the pointing device were simultaneously clicked. The middle section comprises a graphical button bar similar to the main button bar of a typical GUI. In some instances where the functionality is the same, the same icon that is used on the main menu bar of the GUI is used to designate that function.

While the navigation palette is displayed, if the user simultaneously actuates the buttons when the cursor is located outside the boundaries of the palette or double clicking the first button while the cursor is on the palette icon, the palette program module is terminated and the palette is no longer displayed.

The pop-up navigation palette is a modeless window. Well known to those skilled in the art of computer programming for the Windows™ environment is the fact that a modeless window enables a user to access the features and commands of the modeless window itself, and will simultaneously allow the user to access the features and commands of the main program. The user navigates by selecting controls graphically represented in the palette using keyboard arrow keys or a pointing device which moves the cursor over the desired icon of the palette and the actuating the ENTER key or actuating the first mouse button. Until the user selects an item from the palette, no action will be initiated in response to the action selected.

BRIEF DESCRIPTION OF DRAWINGS

For fuller understanding of the present invention, reference is made to the accompanying drawing in the following detailed description of the Best Mode For Carrying Out the Invention. In the drawing:

FIG. 2 illustrates a pop-up navigation palette as it appears on the screen of a GUI according to the principles of the present invention.

FIG. 3 illustrates a two-column menu accessed via the navigation palette of FIG. 2.

FIG. 4 illustrates the continuation of the two-column menu of FIG. 3.

Figure 1:
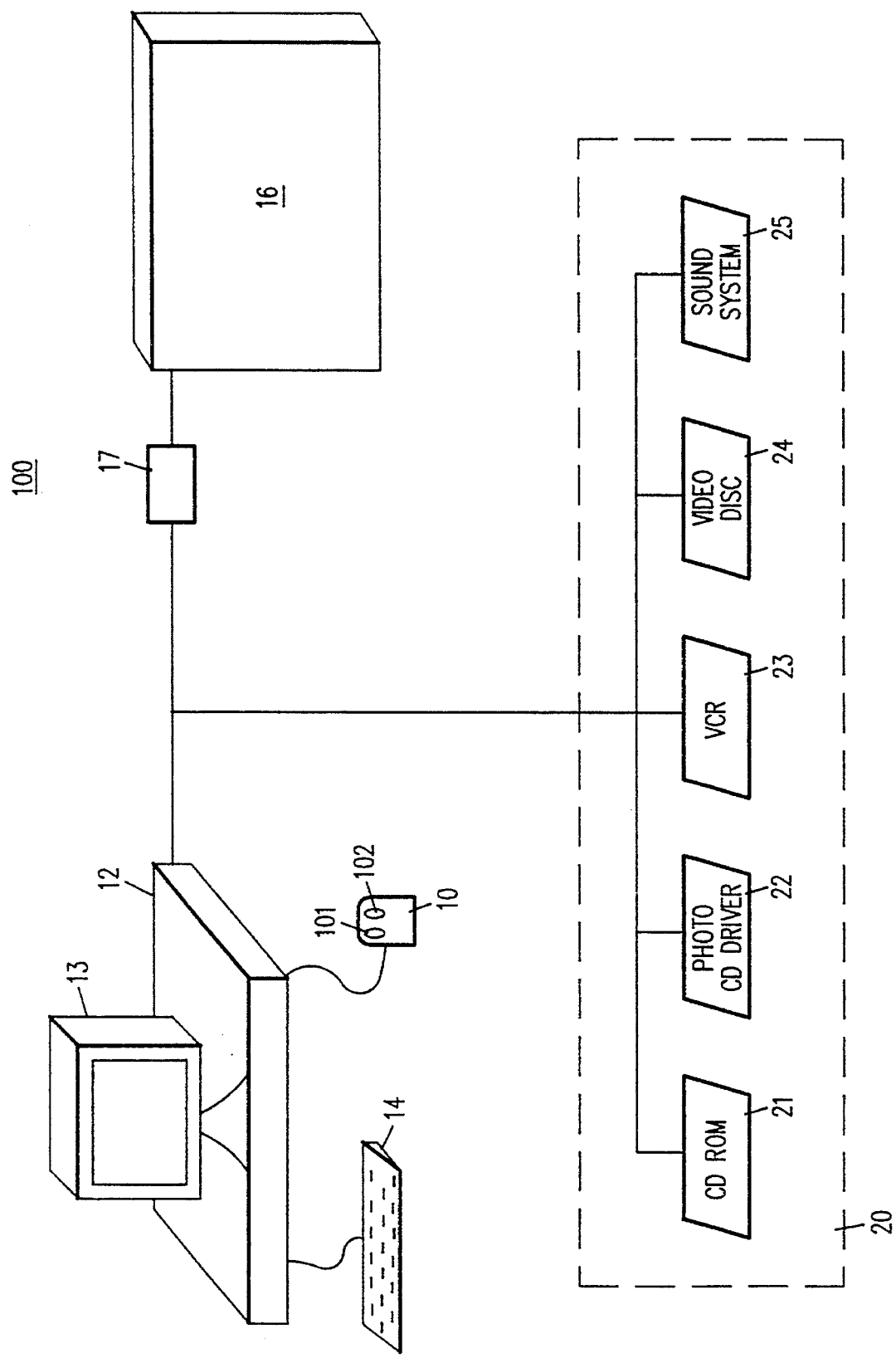
FIG. 1 illustrates a system for producing multimedia slide presentations which incorporates the increased functionality of pointing devices according to the present invention.

Reference numbers refer to the same or equivalent parts of the present invention throughout the several figures of the drawing.

BEST MODE FOR CARRYING OUT THE INVENTION

Referring to FIG. 1, system 100 having a UI cooperating with a GUI which includes a pointing device having increased functionality according to the present invention for creating a multimedia slide presentation on a personal computer comprises pointing device 10 coupled to computer 12. Display monitor 13 and input keyboard 14 are also coupled to computer 12. In addition, multimedia devices 20, typically comprising CD ROM 21, photo CD drive 22, video cassette recorder (VCR) 23, video disk drive 24 and speakers 25, are also coupled to computer 12.

Computer 12 is typically a personal computer, such as an IBM PS/2 or equivalent, having 20 megahertz operating speed and a 80386 SX microprocessor, manufactured by Intel Corp., or equivalent, on which an MS-DOS 3.1 operating system, together with a Microsoft Windows 3.1 GUI is installed. Pointing device 10 should be a Windows-compatible mouse, trackball or other pointing device having at least first and second control buttons 101 and 102, respectively. Computer 12 should also include a floppy disk drive, a hard disk with at least 4 to 12 megabytes of available disk space, at least 2 megabytes of random access memory (RAM) and a graphics adapter card such as VGA, Super VGA or other Windows-compatible adapter.

The GUI is more particularly described in the User's Guide For The Windows Graphical Environment, MS-DOS Operating System, published by Microsoft Corporation, 1990–92, which is incorporated by reference as if fully set forth herein. The specific design of the GUI forms no part of the present invention.

UIs may be considered extensions of GUIs which add functionality and graphical representations which are not typically part of a currently available GUI. Therefore, all of the functions and graphical representations provided by a UI could be incorporated into most GUIs.

In addition, in order to utilize multimedia capabilities, computer 12 should include a 256-color video adapter and a Windows-compatible version 3.1 driver, a Media Controlled Interface (MCI) compatible sound card for playback of wave audio and Musical Instrument Digital Interface (MIDI) files, a video data capture program, and a video overlay board. The design of the components of system 100 also forms no part of the present invention.

All of the foregoing elements of system 100 are portable and may be transported to the presentation site. Although it is not a necessity, it may be desirable to have a large screen 16 disposed in the room where the presentation is to be given. The large screen 16 may have a driver unit 17 coupled to the computer 12 and to the screen 16. In other situations, projection means (not shown) may be available for projecting images from the display monitor 13 of the computer 10 onto a larger screen.

A multimedia presentation delivers its message with music, voice-overs, vivid images, and motion in addition to text and graphics. Sound may be produced in a Wave Audio File, a MIDI (Musical Instrument Digital Interface) file, and CD Audio formats. Video may be provided in digital file format or in video disk overlay. If Windows 3.1 is used, animation may be provided in file formats that are compatible with a standard known as the Media Control Interface (MCI) standard, since Windows 3.1 provides the MCI and, in addition, provides three MCI drivers: one controls the MIDI sequencer, one controls sound for Wave Audio Files, and one controls sound for CD Audio devices.

As noted elsewhere in this specification, some GUIs provide the capability to invert the typical functionality of the pointing device buttons. Therefore, while the so-called "left" button is active according to the usual convention, the "right" button may become active if so desired by the user. Thus, for purposes of describing the present invention, the first button refers to the usually active button for selecting objects and icons and initiating actions according to the prior art, and the second button refers to the newly added functionality of a pointing device according to the present invention. In addition, it should be noted also that the pointing device may have more than two buttons. Obviously, even more functionality can be added by activating all buttons available and actuating any combination of two or more of them simultaneously.

In operation, according to the present invention, simultaneous actuation of the first and second buttons on the pointing device when the cursor is located on a slide initiates display of navigation palette 200 having at least three tiers or sections as shown in FIG. 2. Simultaneous clicking of both buttons, according to the present invention, does not necessarily mean that the user must press both buttons simultaneously. The navigation palette will appear at any time when both mouse buttons are down at the same time. The navigation palette is a modeless window.

The topmost section of the navigation palette is the caption and contains text 205. This text can be wording the user desires. For an exemplary presentation system known as Compel, this section contains the word "TwinClick". Also in the top-left-corner of the top section is box 201 on which the user can double-click the first mouse button to hide the palette.

The middle section of the palette contains graphical buttons that perform actions when the user clicks on them with the mouse. This section is similar to toolbars found in other GUI applications. In Compel, the icons perform the following actions: open another presentation, go to slide editing view, pause/resume the presentation and multimedia devices, black/unblack screen and help as shown at button bar 206. These actions are described elsewhere in this specification.

With continuing reference to FIG. 2, the bottom section of the navigation palette contains controls for navigating through the presentation slides. Navigation pallet 200 may be overlaid on presentation slide 215 for display on screen 216 of display monitor 13. Button 202 in the lower left corner is used to go to the previous slide and button 203 in the lower-right corner is used to go to the next slide in the presentation sequence. Middle button 204 is used to navigate to any slide in the presentation. The format of the text in middle button 204 is the current slide and total number of slides in the following form: "< current slide> of <total slides>". When the user presses this button, a two-column menu appears with a listing of the slides as shown in FIG. 3. The list of slides is ordered by slide number. The listing of the slides consists of the slide number on the left column of the menu and the slide name in the right column. A check mark appears on the left side of the item representing the slide that is currently viewed.

The user can navigate to a slide by clicking with the first mouse button on the entry representing the slide. Alternatively, the user can use the up/down arrow keys on keyboard 14 to select a slide and hit the ENTER key to navigate to the slide. If more than 20 slides exist in the presentation, a 21st entry is appended to the end of the popup list that says "More . . . ". When the user selects "More", a dialog appears that shows a scrolling list box containing all of the slides in the presentation as shown in FIG. 4.

The navigation palette provides a set of specific controls for controlling on-screen presentation of a presentation set of slides. The on-screen presentation may be automatically or interactively controlled.

The controls and related commands provided by the navigation palette are listed below.

TABLE I

| Open a new presentation file | selected for initiating a presentation |
| Edit presentation | selected for creating and modifying objects on slides |
| Show/hide the selection arrow | selected for hiding or revealing the cursor |
| Black/unblack the screen | |
| Pause and resume | selected for stopping and starting an automatic slide presentation as shown or special effects or video |
| Display slide show help | selected for displaying help information |
| Display next slide | |
| Display previous slide | |

TABLE I-continued

Display any slide

The navigation palette helps you find a specific slide in your presentation. The button bar of the palette has commands to open a presentation, display slide view, hide and show the cursor, pause and resume multimedia devices, black the screen, and display Help as shown in FIG. 2.

While navigating in and controlling an on-screen slide show during a presentation, the user can pause and resume any special effects or multimedia clips using the navigation palette. In addition, in a multimedia presentation, the user can start and stop media clips to adjust the material during the presentation.

Whether a presentation is automatic or interactive, the navigation palette can be used to quickly display any slide, black and unblack the screen, show or hide the selection arrow, or pause and resume the slide show.

Figure 5:
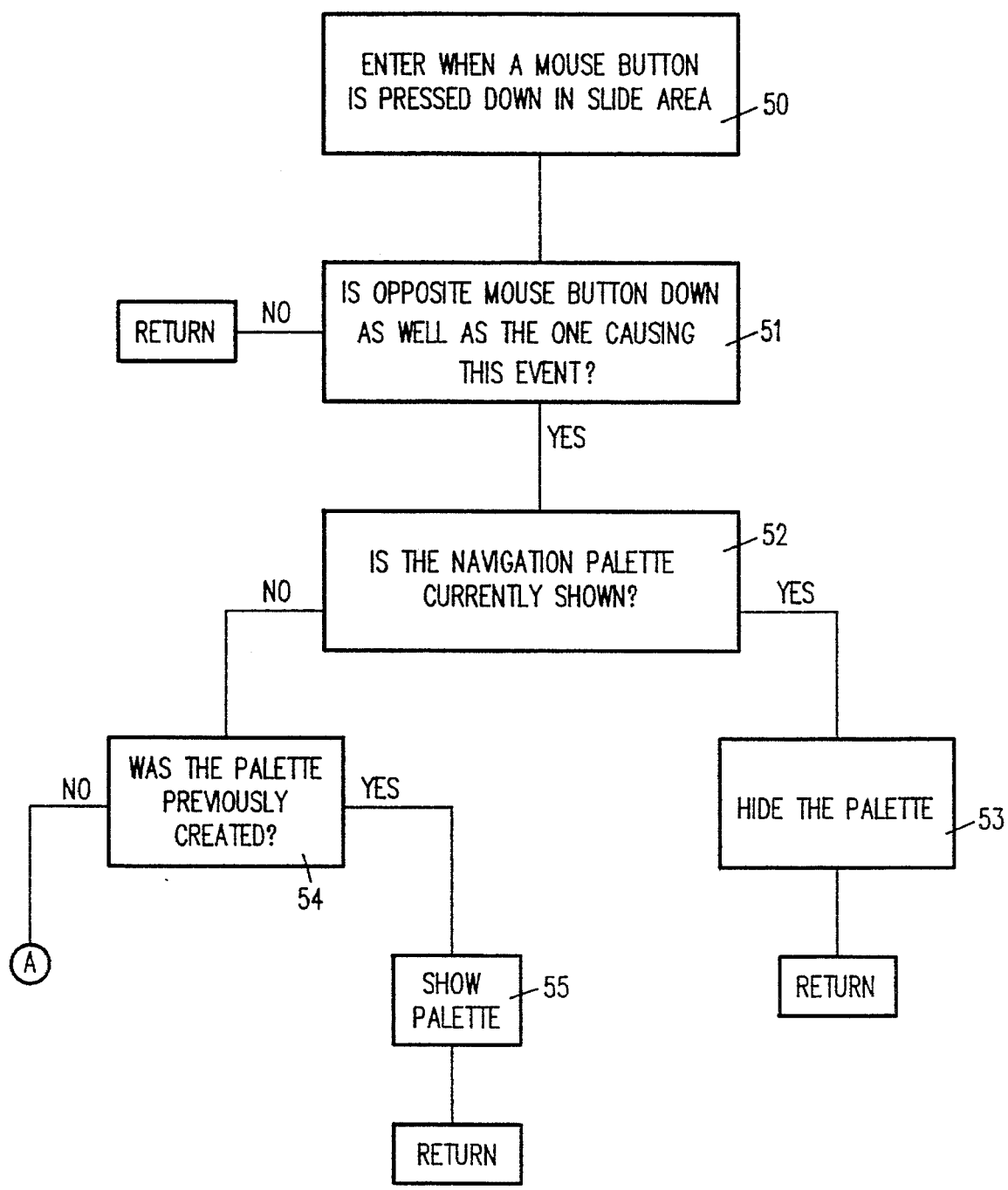
FIG. 5 is a flow chart of the TwinClick portion of the Compel UI for displaying the popup navigation palette of FIG. 2.

Referring now to FIG. 5, step 50 of the TwinClick portion of the Compel UI is invoked each time a mouse button is actuated. At step 51, the program determines whether at least two pointing device buttons have been actuated simultaneously with the cursor placed on a slide during a presentation. At step 52, the program determines whether a navigation palette is already displayed on the display monitor 13. If a navigation palette is currently displayed, the program hides the palette at step 53. If no navigation palette is currently displayed, the program determines whether a navigation palette was previously created at step 54. If a navigation palette was previously created, step 55 initiates display of the navigation palette. If no navigation palette was previously created, the program initiates instructions for creating a navigation palette.

Figure 6:
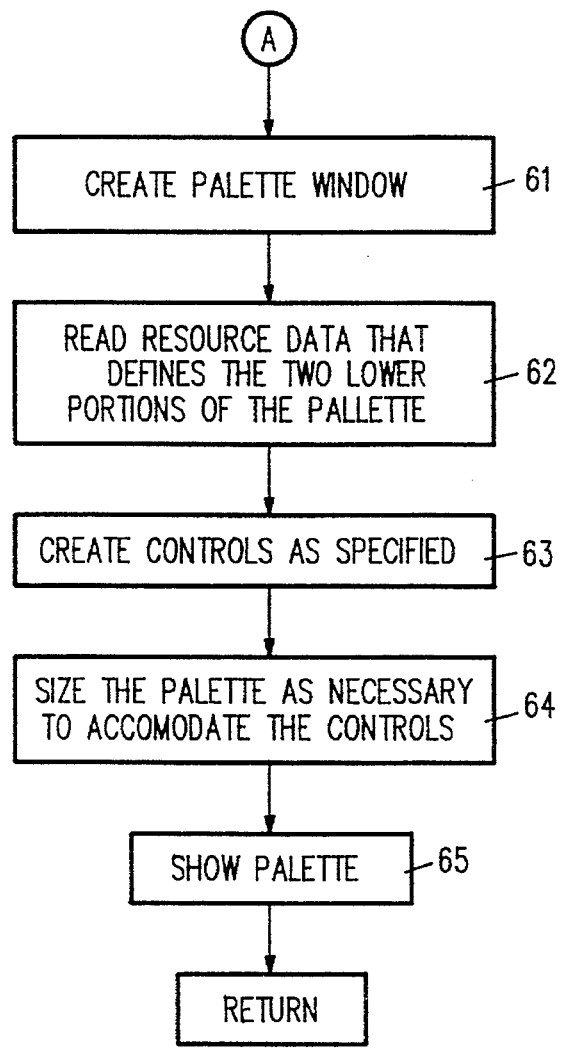
FIG. 6 is a flow chart of the TwinClick portion of the Compel UI for creating the popup navigation palette of FIG. 2.

With reference now to FIG. 6, the TwinClick portion of the Compel UI creates a navigation palette beginning at step 61. At step 62, resource data which defines portions of the navigation palette is read. At step 63, graphical symbols of controls as specified in the resource data, are created. At step 64, the size of the navigation palette is adjusted as required. Step 65 corresponds to step 55 of FIG. 5.

Figure 7:
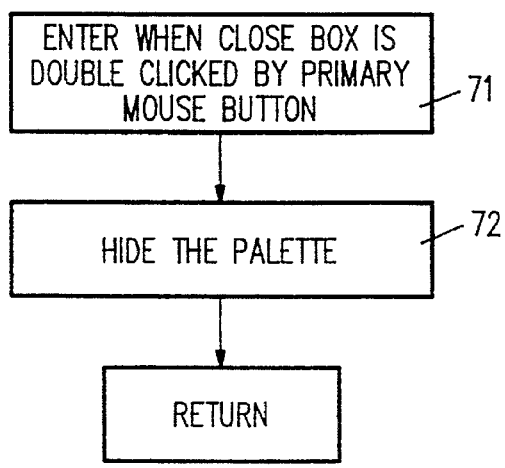
FIG. 7 is a flow chart of the TwinClick portion of the Compel UI for removing the navigation palette of FIG. 2 from the display.

Referring now to FIG. 7, the user may remove the navigation palette from the display by double clicking the first mouse button on the close box of the palette. At step 71, the TwinClick portion of the Compel UI initiates action to hide the palette. Step 72 corresponds to step 53 of FIG. 5. In the convention of the present invention, "return" refers to returning control of the display to the UI.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. The invention illustratively disclosed herein may be practiced without any element which is not specifically disclosed herein. Specifically, the TwinClick portion of the present invention is broadly applicable to a wide range of graphical user interface applications, and its use therefore is explicitly comprehended by the teachings of the present invention.

We claim:

1. A method for using a navigation palette for creating and editing a multimedia slide presentation on a computer system, said computer system including a programmed computer, an input device coupled to said computer and selected from the group consisting of trackball and mouse, and a display device coupled with said computer, the method forming a programmed user interface and comprising the steps of:

determining if two buttons on said input device are actuated substantially simultaneously;

determining if said navigation palette is currently shown on said display means;

if said navigation palette is shown on said display device, hiding said navigation palette;

if said navigation palette is not shown on said display means, determining if said navigation palette was previously created;

if said navigation palette is not shown on said display means and if said navigation palette was previously created, showing said navigation palette on said display device;

if said navigation palette is not shown on said display means and if said navigation palette was not previously created, creating said navigation palette by
a) creating a palette window,
b) reading resource data from said computer, said resource data for defining portions of said navigation palette,
c) creating graphical control symbols as specified in said resource data;
d) adjusting the size of said navigation palette as required to include said graphical control symbols in said navigation palette, and;

showing said navigation palette on said display device.

* * * * *